April 12, 1960 A. M. DEXTER, JR., ET AL 2,932,089
CONTINUOUS ELECTRIC DIMENSION GAGE
Filed Dec. 3, 1957 4 Sheets-Sheet 1
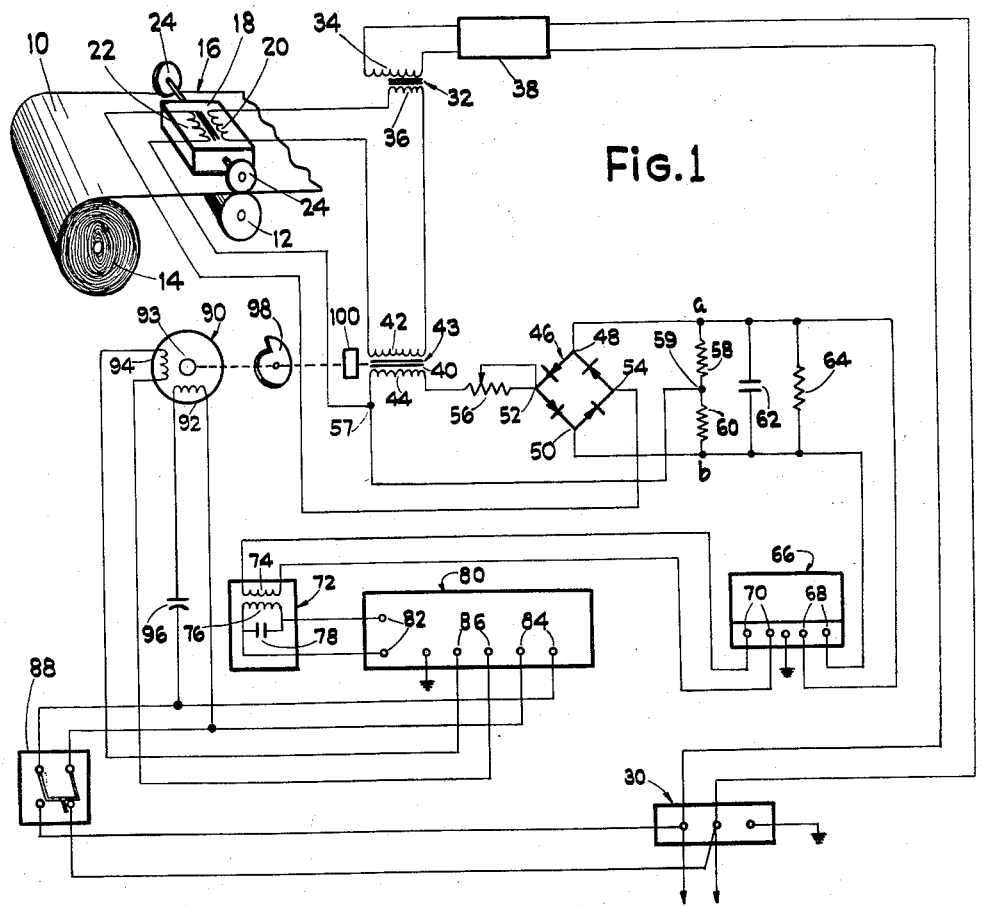
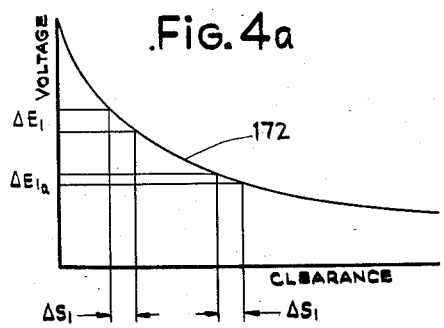
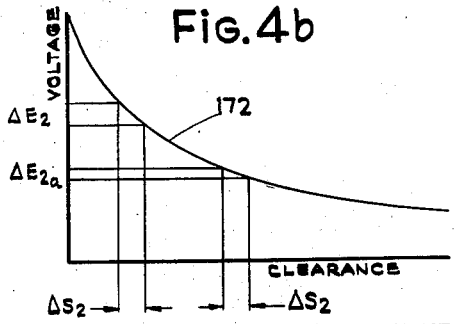
INVENTOR.
ALBERT M. DEXTER, JR.
JOSEPH W. WINCZE
BY
*Joseph M. Schofield*
ATTORNEY April 12, 1960  A. M. DEXTER, JR., ET AL  2,932,089
CONTINUOUS ELECTRIC DIMENSION GAGE
Filed Dec. 3, 1957  4 Sheets-Sheet 2

INVENTOR.
ALBERT M. DEXTER, JR.
JOSEPH W. WINCZE
BY
ATTORNEY

April 12, 1960   A. M. DEXTER, JR., ET AL   2,932,089
CONTINUOUS ELECTRIC DIMENSION GAGE
Filed Dec. 3, 1957   4 Sheets-Sheet 3

INVENTOR.
ALBERT M. DEXTER, JR.
JOSEPH W. WINCZE
BY
Joseph H. Schofield
ATTORNEY April 12, 1960  A. M. DEXTER, JR., ET AL  2,932,089
CONTINUOUS ELECTRIC DIMENSION GAGE
Filed Dec. 3, 1957  4 Sheets-Sheet 4

INVENTOR.
ALBERT M. DEXTER, JR.
JOSEPH W. WINCZE
BY
Joseph W. Schofield
ATTORNEY

United States Patent Office 2,932,089
Patented Apr. 12, 1960

2,932,089

CONTINUOUS ELECTRIC DIMENSION GAGE

Albert M. Dexter, Jr., Farmington, and Joseph W. Wincze, West Hartford, Conn., assignors to Pratt & Whitney Company, Incorporated, West Hartford, Conn., a corporation of Delaware Application December 3, 1957, Serial No. 700,364

7 Claims. (Cl. 33—147)

This invention relates to an improved dimension gaging system of the continuous type.

In the process for rolling non-magnetic material, such as rubber, plastics, etc., it is of extreme importance to be able to continuously know the exact thickness of the material as it emerges from between the final sizing rollers. Without such continuous information hundreds of feet of material may be rolled before an off-gage error is detected. This of course necessitates that the material must be discarded or at best reworked at additional expense to the manufacturer. Also subsequent gaging may be required after the final rolling operation.

In preferred form, the continuous electrical dimension gage, in accordance with this invention, comprises a gaging head and a setter member. The gaging head comprises a pair of rollers mounted on a support for yieldingly engaging the surface of non-ferromagnetic strip material during the gaging operation. A first magnetic core is mounted on the support, and a drum of ferromagnetically permeable composition is arranged on the underside of said material so as to define a first air gap with the first core. First electromagnetic means are provided for deriving an electrical output as a function of the length of the first air gap. The setter member comprises a second magnetic core with a ferromagnetically permeable mass mounted in proximity thereto to provide a second air gap therebetween. Means are provided for actuating the ferromagnetic mass so as to vary the length of the second air gap, and second electromagnetic means are provided for deriving an electrical output which is a function of the length of said second air gap. The outputs of the first and second electromagnetic means are applied to a phase-detector, so as to provide a differential error output for the detector. Motor means are mechanically coupled to the actuating means, and circuit means apply the differential error output to the motor, whereby the ferromagnetically permeable mass is actuated in such direction as to produce zero output in the detector, the displacement of the ferromagnetically permeable mass forming part of the setter member being a function of the change in thickness of the material.

Accordingly it is an object of this invention to provide an improved electric gaging system which will continuously and accurately measure the thickness of non-magnetic strip material as it is being passed at high speed over the drum.

Another object is to provide an improved electric gaging system which may be quickly adjusted to enable the operator to gage non-magnetic materials to an extreme precision throughout various ranges.

The novel features which are believed to be characterisic of the invention are set forth with particularity in the appended claims. The invention itself, however, both as to its organization and method of operation, together with further objects and advantages thereof, may best be understood by reference to the following description when read in connection with the accompanying drawings in which:

Figure 1 is a schematic diagram showing the relationship between the various components of the continuous gage in accordance with one illustrative embodiment of the invention;

Figs. 4a, 4b are voltage vs. clearance curves for the gaging head and the setter respectively;

The invention will be illustrated and described in the continuous process for rolling sheet rubber, although it should be understood that it will be equally applicable in other processing situations where continuous dimensional information is required in order to control the quality of the finished product.

Figures 2, 3:
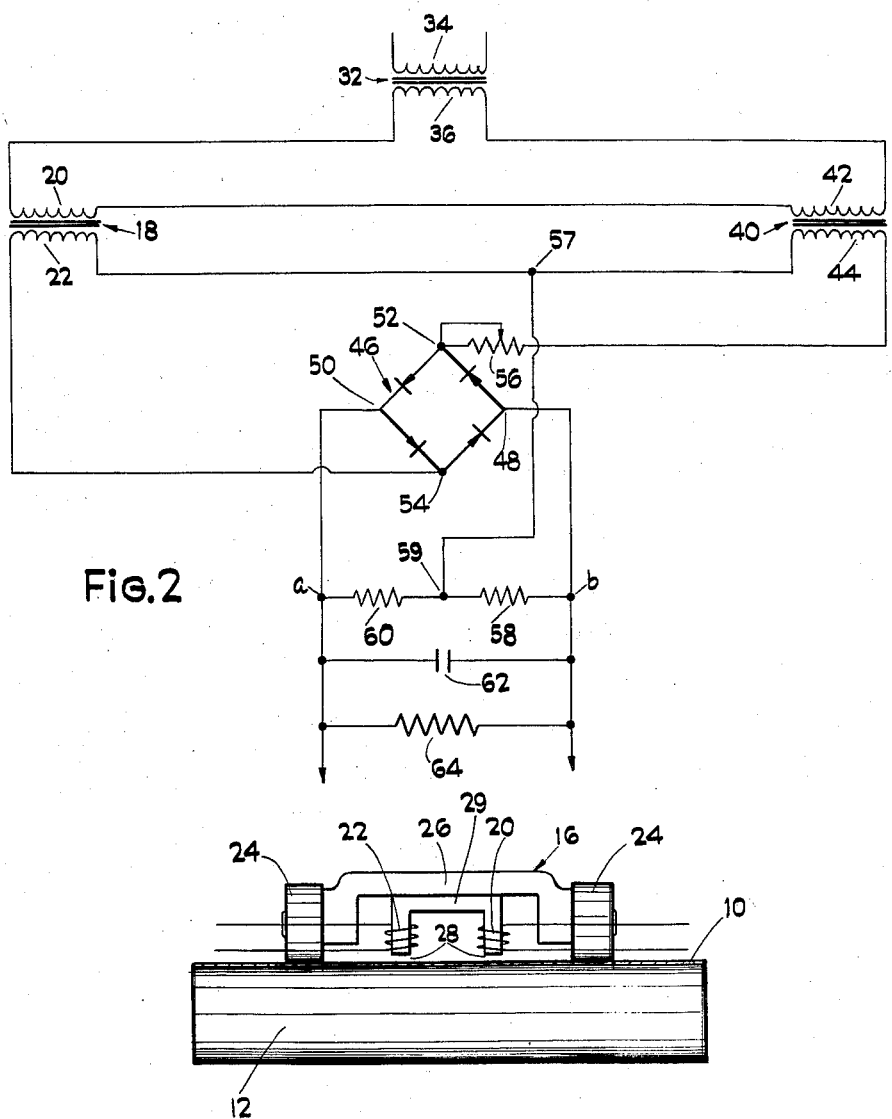
Fig. 2 is a simplified wiring diagram used in describing the operation of the device.
Fig. 3 is an elevational view, partly pictorial, disclosing the relationship of the gaging head to the material being gaged.

Referring now to Figs. 1, 2 and 3 of the drawings, the rubber sheet material 10 is passed over a ferromagnetically permeable idler drum 12 to a take-up reel 14. The gaging system here disclosed is utilized to continuously ascertain the thickness of the rubber sheet so that this dimensional intelligence may be used to control the rolling process to insure uniform thickness of product. In the illustrated embodiment schematically depicted in Fig. 1, the various members are arranged in such fashion so as to facilitate understanding of the invention. It should, of course, be understood that in a practical embodiment, the various components are conveniently packaged in a unitary structure.

The gaging system comprises a gaging head 16, a balancing motor 90, a compensating or setter arrangement 43, a ring rectifier 46, a D.C. chopper 66, and an amplifier 80. The rectifier ring 46 acts as a phase sensitive detector so that the magnitude and phase of the voltage appearing across the resistors 58, 60 at points $a$, $b$ is the error voltage, and hence a function of the thickness of the material being gaged.

The gaging head 16 comprises a transformer 18 having a primary 20 and secondary 22. A pair of rollers 24 are arranged so as to yieldingly engage the material being gaged, that is, the rollers are mounted so as to be displaceable in the vertical direction whenever the material increases or decreases in thickness. As best shown in Fig. 3, the transformer coils 20, 22 are wound on a U-shaped iron core which forms a first magnetic core, the yoke of which is secured to a suitable structure 26 in which the rollers 24 are rotatably mounted. The ends of the U-shaped core are arranged in proximity to the drum 12, so as to provide equal air gaps 28. In operation, the air gaps are initially adjusted to provide a finite spacing from the surface of material 10.

The usual line power supply is indicated at 30. A voltage regulator 38 is interposed in the line between the primary 34 of a step-down transformer 32 and the supply source 30. The regulator serves to maintain the voltage supply substantially constant despite the occasional changes in the line voltage. Thus the gaging system is isolated from possible sources of spurious signals. The secondary 36 of transformer 32 is connected serially with the primaries 20, 42 of transformers 18 and 40 respectively.

The ring rectifier 46 has its diagonally opposite corners 48, 50 connected across resistors 58, 60 which are connected in series. These serially connected resistors are shunted by a smoothing or filter condenser 62 and an output resistor 64. The mid-point 59 of resistors 58, 60 is connected to one side of the secondary 44 of transformer 40 at 57, the other side of the transformer secondary 44 is connected through a potentiometer 56 to another diagonal corner 52 of the ring rectifier 46. The corner diagonal to corner 52 is identified as 54. This latter corner is connected to one side of secondary 22 of transformer 18. The other side of the secondary 22 is connected to one side of secondary 44 at 57 and to the mid-point 59 of the serially connected resistors 58, 60 as shown.

The output developed across resistor 64 is applied to the input terminals 68 of the D.C. chopper 66, the output terminals 70 of which are connected to the primary 74 of input transformer 72. The chopper may be of any commercially available type—its function is to convert the D.C. output appearing across resistor 64 into an alternating signal for subsequent amplification.

The input transformer 72 has its secondary 76 shunted by a condenser 78. The secondary voltage is applied to input terminals 82 of the amplifier 80. A switch, indicated at 88, is connected to the terminals 84 of the amplifier 80 and to winding 92 of motor 90 as will presently be explained. Upon the closing of the switch 88, the motor 90 and the amplifier 80 are energized. (The line supply voltage which is applied to the amplifier is of course suitably rectified to provide the B supply for the tubes. The filament voltage for the amplifier 80 as well as the excitation voltage for the chopper 66 is supplied by separate means not indicated on the drawing.) The output terminals for the amplifier are at 86.

The balancing motor 90 utilized here is a two phase induction motor of a type well known in the art. The stator has two windings 92 and 94 which are arranged to magnetize the machine in perpendicular directions. The rotor 93 is a short circuited winding of wire or a squirrel cage winding. The reference phase winding 92 is connected to the line source 30 through a condenser 96 and switch 88. The rotor 93 is coupled through a gearing arrangement to the shaft 102 (Fig. 6) to which a cam 98 is affixed. As will shortly be made clear, cam 98 is adapted to effect the displacement of armature 100 in the magnetic circuit of the setter 43.

Figure 5:
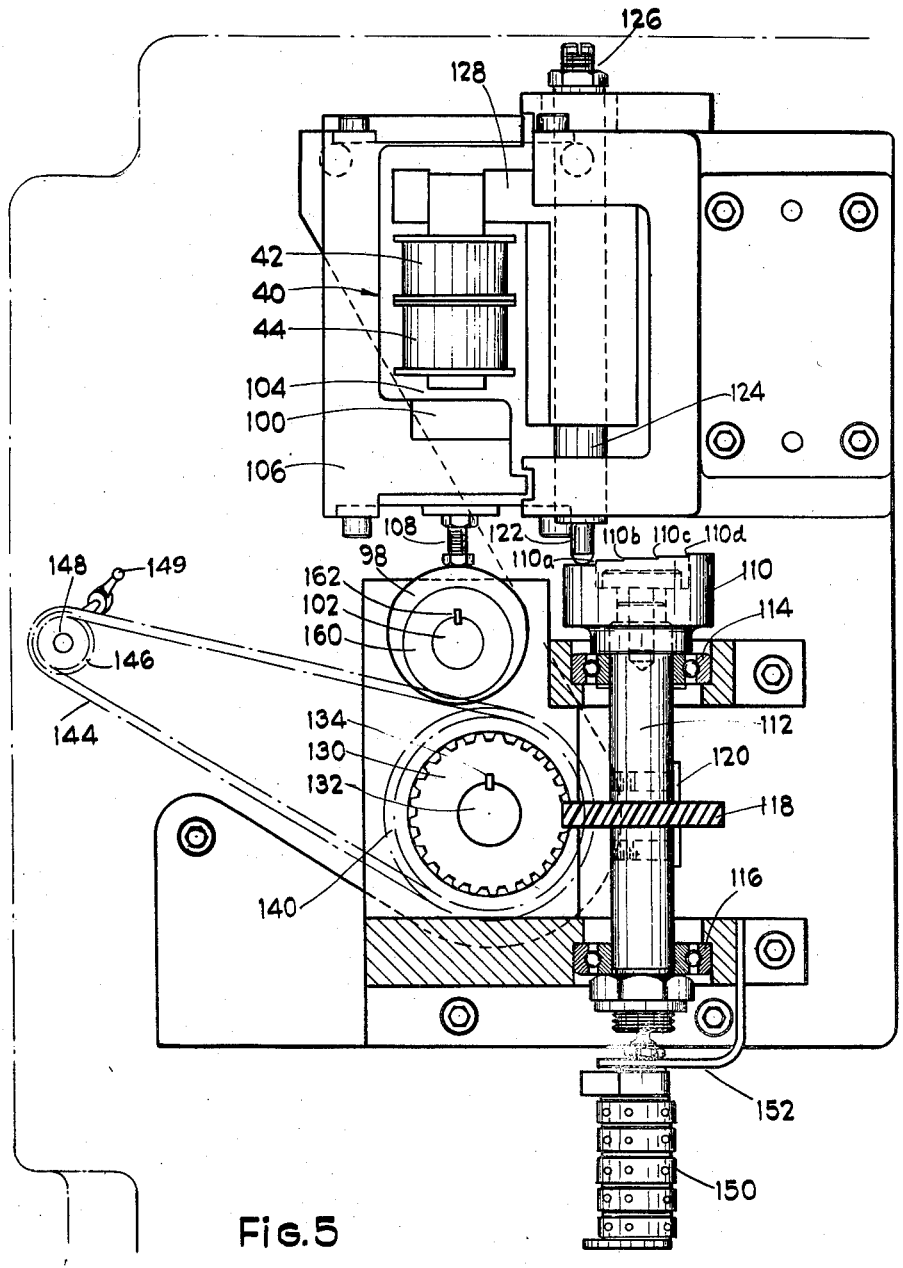
Fig. 5 is a front elevational view, partially in section, of the setter arrangement.
Figure 6:
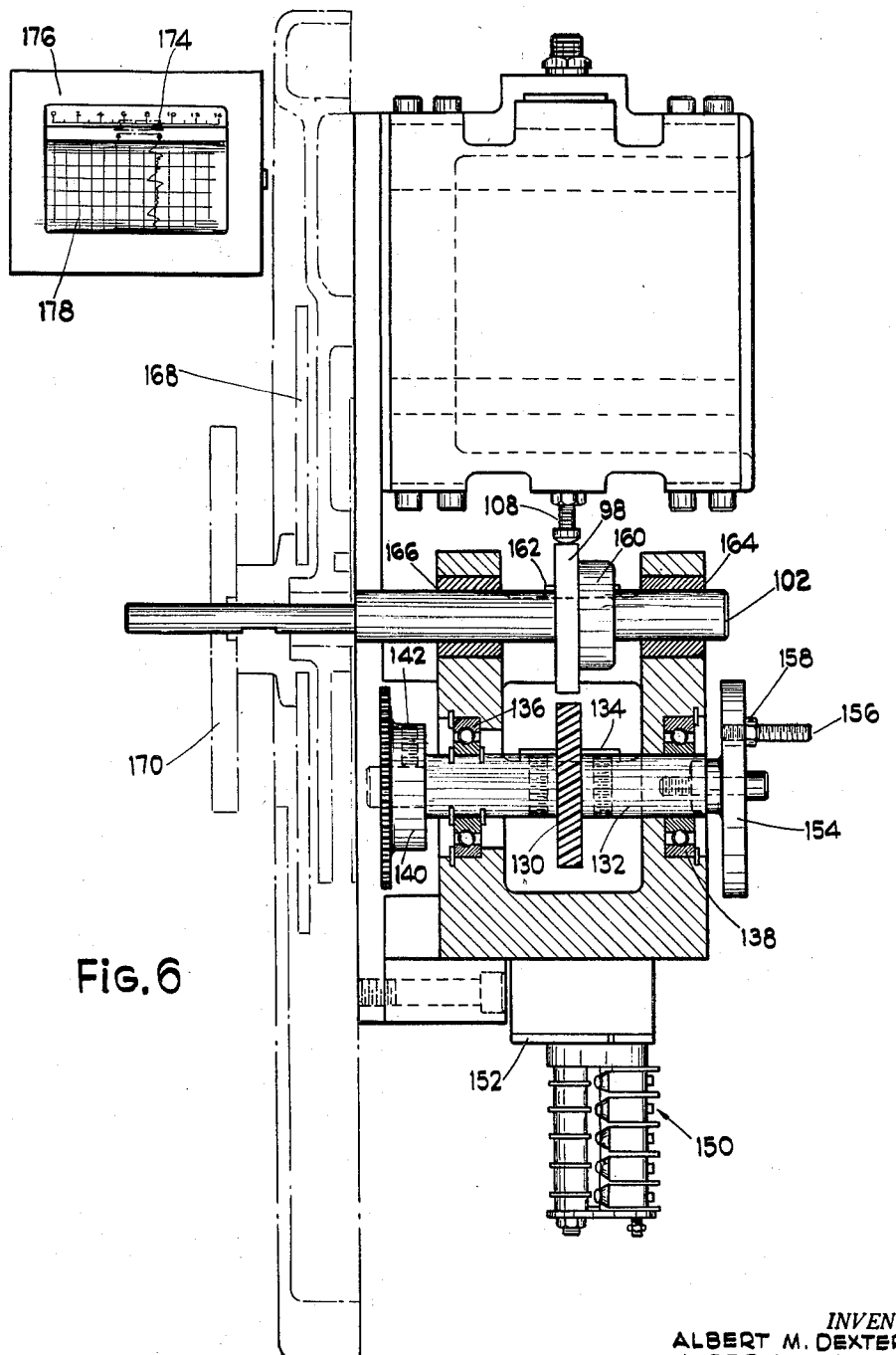
Fig. 6 is a left side elevational view, partially in section, showing the setter arrangement.

The compensating or setter arrangement 43 is disclosed in greater detail in Figs. 5, 6. The secondary 44 of transformer 40 the core 43 of which forms a second magnetic core is positioned in proximity to armature 100 so as to define an air gap 104. The armature 100 is permanently secured to member 106, the whole being adapted for displacement in the vertical direction by means of the hexagonal diamond contact follower 108 (which is secured to member 106) and cam 98. As will be seen in Figs. 5 and 6, the follower 108 is in contiguous relation with the periphery of linear cam 98.

The cam 98 has a linear rise of .020″ in 334° of revolution; the armature 100 is displaceable to increase or decrease the air gap 104 a maximum of .020″. In order to increase the range of the continuous gage, a manually operated step-cam 110 is provided; this cam is provided with four steps: 110a, 110b, 110c, 110d, the magnitude of rise being .018″ for the first step and .020″ for the succeeding steps. Thus there are provided four operating ranges for the gage: 0–.020″, .018″–.038″, .036″–.056″ and .054 to .074″.

The cam 110 is mounted on a shaft 112 suitably supported in the housing by ball bearings 114, 116. A helical gear 118 is secured to shaft 112 by means of a key 120. An adjustable contact point 122 is mounted at the end of a rod member 124 so that it may be moved into engagement with a selected step on cam 110. The initial adjustment of the contact point 122 is made by moving the bar or shaft 124 to obtain a null, and then securing it in position by means of the thread and nut arrangement 126. The transformer 40 is secured in a bracket 128 by means not shown on the drawing. When disposed in this manner, the transformer 40 moves in unison with the contact point 122, so that, for example, an upward displacement of member 122 of .018″ by rotating cam 110 one step will result in an increase in the air gap 104 of exactly .018″.

To rotate the cam 110 to engage point 122 with another step, a helical gear 130 is mounted on shaft 132 by means of a key 134. The shaft 132 is suitably supported for rotation in the housing by means of ball bearing members 136, 138 (Fig. 6). A sprocket 140 is also secured to shaft 132 by means of a set screw 142. A ladder chain 144 is passed over the sprocket 140 and around a second sprocket member 146 mounted on a shaft 148. This latter shaft extends for some distance and protrudes from the housing of the gage where a manually operated range selection knob or lever 149 may be conveniently mounted.

A rotary gang micro-switch shown generally at 150 is secured by means of a bracket 152 to the housing. The actuation of a particular component of the rotary switch by rotation of shaft 112 completes an electrical circuit to respectively energize a selected signal such as a light on a panel board (not shown) to enable the operator to determine at what range the gage will be operated. That is, on what particular step of cam 110 the contact 122 is resting and thus for what range the gage is adjusted. The shaft 132 also has a plate member 154 mounted for rotation therewith; a screw 156 engaging an off center tapped hole in plate 154, and a lock nut 158, serve to limit rotation of shaft 132 between predetermined angular displacement.

As best shown in Fig. 6, the cam 98 with its associated boss 160 is secured to shaft 102 by means of a key 162. The shaft 102 is rotatably supported in the housing by bearings 164, 166. At one end shaft 102 has a reduced diameter; this reduced end carries gears 168 and drum 170 shown in phantom section. The gear 168 is adapted to engage other gearing (not shown) so that the rotor 93 of motor 90 is effectively coupled to and rotates shaft 102. The drum 170 is connected by any suitable driving arrangement (not shown) to the pointer 174 of a recorder 176 such as a Bristol recorder or other indicator preferably having a chart 178 which moves along a scale suitably calibrated to indicate the thickness of the material being gaged. This dimension is a function of the angular position of the cam 98.

The operation of the device is as follows: The stepped cam 110 is rotated to secure the proper range of operation for the dimension being gaged. A standard of the ideal or nominal thickness of the material to be gaged is inserted between rollers 24 and the drum 12 (Fig. 3). The rod 124 (Fig. 5) is displaced axially until the output developed across resistor 64 (Fig. 1) is zero. The rod 124 is then locked in position by means of the thread and nut arrangement 126, and the standard is then removed. In the actual practical embodiment the null position will be observed by means of a pointer actuated by the driving means connected to drum 170. This indicates a particular rotative position of cam 98.

In the null position there is a finite gap or clearance 28 between the end of the core of transformer 18 (Fig. 3) and the permeable drum 12; there is also a gap or clearance 104 of equal magnitude between the end of the core of transformer 40 (Fig. 5) and the armature 100. As will presently be made clear, the transformers 18 and 40 in this condition produce currents which are equal and opposite at balance, or null, and the output developed across the resistor 64 is zero. Assume now that the material being gaged begins to run oversize. This causes the rollers 24 which ride on the material to be displaced upwardly. In effect, this causes an increase in the length of the gap or clearance 28, i.e., the distance from the ends of the transformer core 29 to the permeable drum 12 has increased by an amount $\Delta S_1$. This alteration in length of the magnetic path, linking the secondary 22, causes a voltage $\Delta E_1$ to be induced (Fig. 4a). The voltage $\Delta E_1$ results in net D.C. output appearing across resistor 64. The secondary 44 of fixed transformer 40 supplies an opposing voltage to the phase detector 46. The D.C. error voltage output is then applied to D.C. chopper 66 which converts it into an A.C. signal to be applied to the amplifier 80.

At this point it will be convenient to briefly describe the operation of the motor 90. The amplified error signal from amplifier 80 is applied to winding 94 of motor 90. A fixed voltage 90° out of phase is applied to winding 92. If the error signal is zero the magnetic flux in the motor is established by winding 92 alone. This results in an alternating flux, the axis of which does not rotate; no torque therefore is produced by such a flux. If an error signal is applied to winding 94, the winding carries current and a rotating flux is produced that turns the rotor 93 in a direction to correct the error. When the error is in the reverse direction i.e., an undersize condition, the phase of the current in the winding 94 is reversed, and the direction of rotation of the rotor is thus reversed.

As the rotor 93 turns, this motion is transmitted by means of gearing including gear 168 (Fig. 6) to the shaft 102, thus causing the cam 98 to effect an angular displacement. In the case here supposed, the follower 108 riding on cam 98 causes the housing 106 to descend so that the gap or clearance 104 is increased. The change in clearance or gap length between the end of the core of transformer 40 and the armature 100 causes a change in the voltage induced in secondary 44. This induced voltage has the net effect of producing a D.C. voltage across the resistor 64 of decreased magnitude, and in a very short time, the voltage $\Delta E_2$ induced by the change in clearance 104 $\Delta S_2$ exactly balances the voltage $\Delta E_1$ caused by the change in clearance $\Delta S_1$. At this instant, the rectified voltages are equal and opposite in sign and the net voltage across resistor 64 is thus zero.

The cam 98 in the balancing operation has experienced an angular displacement that is a direct function of $\Delta S_2$ and hence $\Delta S_1$ which represents the change in thickness in the material. The drum 170 also has rotated through the same angular displacement as shaft 102 and gear 168 so that the pointer of the recorder 176 which is mechanically linked to the drum 170 indicates the change in thickness of the material.

The Figs. 4a, 4b serve to explain how inherently non-linear devices may be used to produce a linear response. The voltage vs. clearance relationship for the gaging head and the setter respectively is non-linear as indicated by the curved line 172. The head and the setter are similar in construction. A change in thickness $\Delta S_1$ will produce a change in head output voltage $\Delta E_1$, which instantaneously is the error voltage. In order to produce a net voltage of zero across resistor 64, air gap 104 must change by such magnitude as will cause secondary 44 to induce a voltage $\Delta E_2$ sufficient to cancel $\Delta E_1$; this magnitude is $\Delta S_2$, and since transformers 18 and 40 are essentially similar magnetically, $\Delta S_2$ must be equal to $\Delta S_1$, or some constant proportion of it.

At some other thickness of material, where $\Delta E_{1a}$, for example, is smaller for the same value of increment $\Delta S_1$, it will be seen that a smaller cancelling voltage $\Delta E_{2a}$ is required to nullify $\Delta E_{1a}$, and because the magnetic characteristics are similar, $\Delta S_2$ will again be equal to $\Delta S_1$. Stated differently, $\Delta S_2$ is equal to $\Delta S_1$ for all points along the curve, which result, by definition, is a linear relationship between input ($\Delta S_1$) and output ($\Delta S_2$).

The overall operation of the device has now been described. However, brief reference should be made to the circuitry of Fig. 2. If the material is of the proper or desired thickness the voltage across points $a$, $b$ is zero. If the material should become oversize or undersize an incremental voltage appears across the secondary 22 of transformer 18. The transformer secondaries 22, 44 then complete their circuits through the rectifier ring 46 and a unidirectional voltage appears across points $a$, $b$, the direction of which will depend upon which voltage is of the greater magnitude, i.e., whether the voltage across the secondary 22 is greater than the voltage across secondary 44 or conversely. In the oversize condition, the voltage across secondary 22 will be less than the voltage across 44 because of the fact that the gap or clearance 28 becomes greater.

The voltage wave forms appearing across the secondaries 22, 44 are complex. The phase detector responds principally to the fundamental components and to some extent to the odd components; however, it is substantially nonresponsive to even harmonics. This is of course desirable since we are primarily interested in the fundamental component.

The D.C. output appearing across resistor 64 is applied to the D.C. chopper 66; the chopper or "synchroverter" switch converts D.C. signal into an A.C. signal and in the process of doing so more harmonics are suppressed and the wave becomes more symmetrical.

While certain specified embodiments have been shown and described, it will be understood that various other modifications may be devised, by those skilled in the art, which will embody the principles found in the true spirit and scope of the invention which is defined in the appended claims.

We claim as our invention:

1. A gage for continuously measuring the thickness of non-ferromagnetic strip material, comprising a support, a gaging head thereon, a setter member, said gaging head comprising a pair of rollers mounted on said support for yieldingly engaging the surface of said non-ferromagnetic material, a first magnetic core mounted on said support, a drum of ferromagnetically permeable composition mounted on the underside of said material so as to define a first air gap with said first core, and first electromagnetic means for deriving an electrical output as a function of the length of said first air gap, said setter member comprising a second magnetic core and a ferromagnetically permeable mass supported in proximity thereto so as to provide a second air gap therebetween, means for actuating said ferromagnetically permeable mass so as to vary the length of said second air gap, a second electromagnetic means for deriving an electrical output as a function of the length of said second air gap, a phase detector, the outputs of the first and second electromagnetic means being applied to said phase detector to provide a differential error output, motor means coupled to the said actuating means, and circuit means for applying said differential error output of said detector to said motor means, whereby upon a change in dimension of the material being gaged, the ferromagnetically permeable mass is actuated in such direction so as to produce zero error output in the phase detector, the displacement of said ferromagnetically permeable mass being a function of change in thickness of the material.

2. A gage for continuously measuring the thickness of non-ferromagnetic strip material, comprising a support, a gaging head thereon, a setter member, said gaging head comprising a pair of rollers mounted on said support and displaceable in the vertical direction for yieldingly engaging the surface of said non-ferromagnetic material, a first transformer mounted on said support and including a first core, a drum of magnetically permeable composition mounted on the underside of said material in proximity to the ends of said first transformer core to provide an air gap therebetween, said setter member comprising a second transformer and a ferromagnetically permable mass in proximity thereto, a phase detector means, the first and second transformer secondaries being connected to said detector means to provide a differential error output, and electromechanical means for utilizing the differential error output of said detector means to displace said ferromagnetically permeable mass so as to introduce more or less ferromagnetically permeable material into the circuit of the second transformer secondary, whereby a change in the thickness dimension of the material being gaged induces an incremental voltage in the secondary of the first transformer, the ferromagnetically permeable mass being actuated in such direction so as to produce zero error output, the displacement of said ferromagnetically permeable mass being a function of the change in thickness of said material.

3. A continuous gage according to claim 2 in which said electromechanical means comprises converter means connected to said differential output for converting said differential output into an alternating current signal, a two phase motor having a rotor, a reference phase winding and a signal input phase winding, amplifier means for amplifying said A.C. signal and for applying the amplified signal to the signal input phase winding, and mechanical means coupled to said rotor for actuating said ferromagnetically permeable mass.

4. A gage for continuously measuring the thickness of non-ferromagnetic strip material, comprising a support, a gaging head thereon, a setter member, said gaging head comprising rolling means mounted on said support and displaceable in the vertical direction for yieldingly engaging the surface of said non-ferromagnetic material, a first ferromagnetic circuit means mounted on said support and including a first core, a drum of magnetically permeable composition mounted on the underside of said material in proximity to the ends of said first core to provide an air gap therebetween, said setter member comprising a second ferromagnetic circuit means and a ferromagnetically permeable mass in proximity thereto, a phase detector means, the outputs of said first and second ferromagnetic circuit means being connected to said detector means to provide a differential error output, and electromechanical means for utilizing the differential error output of said detector means to displace said ferromagnetically permeable mass so as to introduce more or less ferromagnetically permeable material into the output circuit of said second ferromagnetic circuit means, whereby a change in thickness dimension of the material being gaged induces an incremental voltage in the second ferromagnetic circuit means, the ferromagnetically permeable mass being actuated in such direction so as to produce zero error output, the displacement of said ferromagnetically permeable mass being a function of change in thickness of the material.

5. A continuous gage according to claim 1 including actuating means for displacing said second magnetic core relative to said ferromagnetically permeable mass.

6. A continuous gage according to claim 2 including actuating means for displacing said second transformer relative to said ferromagnetically permeable mass.

7. A continuous gage according to claim 4 including actuating means for displacing said second ferromagnetic circuit means relative to said ferromagnetically permeable mass.

References Cited in the file of this patent

UNITED STATES PATENTS

| | | |
|---|---|---|
| 2,503,720 | Gieseke | Apr. 11, 1950 |
| 2,676,298 | Frommer | Apr. 20, 1954 |
| 2,769,969 | Comstock | Nov. 6, 1956 |